United States Patent [19]

Kawazura et al.

[11] Patent Number: 5,852,089
[45] Date of Patent: Dec. 22, 1998

[54] RUBBER COMPOSITION FOR TIRE TREADS

[75] Inventors: Tetsuji Kawazura; Eri Miura, both of Hiratsuka, Japan

[73] Assignee: The Yokohama Rubber Co., Ltd., Tokyo, Japan

[21] Appl. No.: 37,363

[22] Filed: Mar. 26, 1993

[30]     Foreign Application Priority Data

Apr. 30, 1992  [JP]  Japan ................................. 4-111306

[51] Int. Cl.$^6$ .................................................. C08K 5/103
[52] U.S. Cl. ..................... 524/308; 524/317; 524/318; 524/534
[58] Field of Search ................... 524/308, 317, 524/318, 534

[56]           References Cited

U.S. PATENT DOCUMENTS 3,671,475  6/1972  Brack ...................................... 525/368
4,379,190  4/1983  Schenk .................................... 524/308
4,885,341  12/1989 Aonuma et al. ........................ 525/232

FOREIGN PATENT DOCUMENTS 0511127   10/1992  European Pat. Off. ............... 524/308
62-253641 11/1987  Japan .
63-97644  4/1988   Japan .
1-113444  5/1989   Japan .

*Primary Examiner*—Andrew E.C. Merriam
*Attorney, Agent, or Firm*—Finnegan, Henderson, Farabow, Garrett & Dunner, L.L.P.

[57]           ABSTRACT

Rubber compositions for automotive tire treads are made up of a selected class of base rubbers and a selected class of synthetic plasticizers in specified amounts. The plasticizer is derived from esterification of a diglycerin or an alkylene oxide adduct of a polyhydric alcohol with a selected class of higher fatty acids. Gripping performance is maintained for a prolonged period of time.

7 Claims, No Drawings

5,852,089

RUBBER COMPOSITION FOR TIRE TREADS

BACKGROUND OF THE INVENTION

1. Technical Field

This invention is directed to rubber compositions for use in automotive tire treads and more particularly to a rubber composition designed to have prolonged gripping performance.

2. Prior Art

In general, pneumatic tires for motor vehicles have been constructed with a cap-base tread, a cap portion of which is required to have as low a hardness as possible with a view to maintaining sufficient gripping on road surfaces at low temperature. To meet this requirement, it has been proposed to blend a cap tread rubber with a synthetic plasticizer such as trimethylolpropane oleate as disclosed for instance in Japanese Patent Laid-Open Publication No. 62-253641, dioctyl sebacate, hexadecyl oleate or the like.

Due to its smaller volatility than aromatic oil also in common use as a plasticizer in the rubber industry, each of the above synthetic plasticizers is reputed to render the resulting cap tread rubber physically satisfactory at low temperature. The plasticizer in question, however, has the drawback that it tends to migrate in the final tire product and penetrate into other tire constituent parts such as a base cap, a belt layer and the like. This will cause the cap tread to grow inadequately harder with time during use or storage of the tire, leading to impaired capability of grip.

SUMMARY OF THE INVENTION

It has now been found that when incorporated with a specific higher fatty acid ester as a plasticizer, rubber compositions for tire treads can be obtained with adequate hardness at low temperature substantially at the same level as is the case with conventional synthetic plasticizers and further with objectionable plasticizer volatility and migration held to an absolute minimum.

The present invention therefore seeks to provide an improved rubber composition for use in tire treads which is highly capable of exhibiting sufficient gripping performance over a prolonged period of time without any substantial change in tread hardness during use or storage of the ultimate tire, thus contributing greatly to safe running.

The above and related objects and advantages of the invention will be readily apparent upon a reading of the following description.

An important aspect of the invention provides a rubber composition for automotive tire treads which comprises at least one base rubber selected from the group consisting of natural rubber, butadiene rubber, styrene-butadiene rubber and polyisoprene rubber, and a plasticizer in an amount of 5 to 40 parts by weight per 100 parts by weight of the at least one base rubber, the plasticizer being derived by reacting a (glycerol dimer condensate) or an alkylene oxide adduct of a polyhydric alcohol with at least one higher fatty acid of 12 to 22 in carbon number or a fatty acid mixture composed predominantly of the at least one higher fatty acid.

DETAILED DESCRIPTION OF THE INVENTION

Rubber compositions contemplated under the present invention are made up essentially of a selected class of base rubbers and a selected class of synthetic plasticizers.

Base rubbers eligible for the purpose of the invention include natural rubber (NR), butadiene rubber (BR), styrene-butadiene rubber (SBR) and polyisoprene rubber (IR), all of which excel in mechanical strength and abrasive resistance among other important qualities. They may be used singly or in combination.

Synthetic plasticizers according to the invention are higher fatty acid esters that are reaction products derivable from esterification of a diglycerin or an alkylene oxide adduct of a polyhydric alcohol with a higher fatty acid of 12 to 22 in carbon number or an fatty acid mixture abundant in such a higher fatty acid.

In the foregoing esterification reaction, polyhydric alcohols are chosen from glycerin, diglycerin, trimethylolpropane, pentaerythritol and the like. Alkylene oxides for addition to the polyhydric alcohol are ethylene oxide, propylene oxide, butylene oxide and the like. The addition number of the alkylene oxide varies with its carbon number and ranges from 1 to 4. Larger addition numbers may be preferably applied to carbon-poor ethylene oxide and smaller addition numbers to carbon-rich butylene oxide. Higher fatty acids as coreactants include those of an unsaturated character such as oleic acid, linoleic acid and the like and those of a saturated character such as lauric acid, myristic acid, palmitic acid, stearic acid, behenic acid and the like, either alone or in combination. Fatty acid mixtures are such prepared to contain more than 50% by weight of either one or more of the higher fatty acids of 12 to 22 carbon atoms exemplified above and less than 50% by weight of a fatty acid outside the above range of carbon atoms.

Specific examples of the synthetic plasticizer according to the invention include a reaction product of diglycerin with oleic acid, a reaction product of diglycerin with linoleic acid, a reaction product of diglycerin with behenic acid, a reaction product of a propylene oxide adduct of glycerin with oleic acid, a reaction product of a propylene oxide adduct of trimethylolpropane with oleic acid, a reaction product of a propylene oxide adduct of trimethylolpropane with linoleic acid and a reaction product of a propylene oxide adduct of pentaerythritol with oleic acid. These reaction products have been found to be highly compatible or miscible with the base rubbers specified hereinabove and hence feasible in producing rubber compositions immune from plasticizer migration and phase separation with time.

The synthetic plasticizer should be added in an amount of 5 to 40 parts by weight based on 100 parts by weight of the base rubber. Below 5 parts would not be effective to reduce hardness of the resulting cap tread. Above 40 parts would cause the cap tread to be mechanically weak, resulting in a tire of unacceptable durability.

To produce the rubber composition according to the invention, various other additives may be employed as commonly accepted for tire tread rubbers. They include carbon blacks, oils, sulfur, zinc oxide, vulcanization accelerators, antioxidants, stearic acid and the like.

The rubber composition of the invention is applicable to automotive tires for summer use and for winter use in particular.

EXAMPLES

The following examples are given to further illustrate the present invention. In these examples, all formulations are indicated by weight part, and all inventive and comparative examples are referred to simply as "IE" and "CE", respectively.

IE-1 to IE-6 and CE-1 to CE-4

Ten different rubber compositions for use in a studless tire tread were prepared as shown in Table 1. Put to use as synthetic plasticizers were compounds A to J as listed in Table 2.

Performance evaluation was made of dynamic modulus, ice skid resistance, plasticizer/oil migration and plasticizer/oil loss on heating with the results listed also in Table 1.

Dynamic Modulus E' at −20° C.

Iwamoto Manufacturing Company's viscoelasticity spectrometer was used with −20° C. in temperature, 20 Hz in frequency and 10±2% in elongation. To facilitate comparison, the modulus value obtained with CE-1 was taken as a reference index of 100. The smaller index, the lower the dynamic modulus and the lower the tread hardness.

Ice Skid Resistance

A British portable-type wet-skid tester was used on an ice-covered road at −2° C. Comparison was made with CE-1 taken as an index of 100. The larger index, the higher the resistance to ice skidding and therefore the higher gripping capability on ice.

Plasticizer/Oil Migration

One rubber composition was formulated as indicated in Table 3 without any plasticizer or oil blended, followed by vulcanization and sheeting. Ten rubber sheets were prepared as standard specimens which were all sized to be 45 mm in diameter and 6 mm in thickness. Ten similar sheets were prepared as test specimens from the rubber mixes of Table 1. The standard and test specimens after being put one on another were let to stand in a chamber for 3 weeks at a load of 40 g/cm$^2$, at a temperature of 20° C. and at a humidity of 65%. Measurement was made for the weight increase of the standard specimen in each pair. With CE-1 as an index of 100, the larger index, the more the plasticizer migration.

Plasticizer/Oil Loss on Heating

Rubber sheets each dimensioned to be 30 mm×30 mm×2 mm were prepared from the rubber mixes of Table 1 and allowed to suspend in a gear oven at 105° C. for 6 hours. The weight change of the sheet was determined before and after heat treatment. With CE-1 as an index of 100, the larger index, the greater the plasticizer loss.

The test results of Table 1 demonstrate that so long as the dynamic modulus and ice skid resistance characteristics are concerned, IE-1 to IE-6 are comparable favorably with CE-1 to CE-4. Unexpectedly surprising effects of IE-1 to IE-6 reside in notably small magnitudes of plasticizer migration and loss on heating. This means that even upon prolonged exposure to adverse ambient conditions, the rubber compositions of the invention are sufficient enough to hold their initial physical characteristics constant as a whole.

IE-7 to IE-9 and CE-5 to CE-7

As shown in Table 4, six different rubber compositions adapted to be used in an automotive tire for summer use were prepared and vulcanized. The same set of tests as in the preceding examples was performed with the results listed also in Table 4.

As is evident from the test results, IE-7 to IE-9 are acceptable in all respects.

TABLE 1

| Run | IE-1 | IE-2 | IE-3 | IE-4 | IE-5 | IE-6 | CE-1 | CE-2 | CE-3 | CE-4 |
| --- | --- | --- | --- | --- | --- | --- | --- | --- | --- | --- |
| Rubber | | | | | | | | | | |
| NR | 60 | 60 | 60 | 60 | 60 | 60 | 60 | 60 | 60 | 60 |
| BR | 40 | 40 | 40 | 40 | 40 | 40 | 40 | 40 | 40 | 40 |
| SBR | — | — | — | — | — | — | — | — | — | — |
| Additive | | | | | | | | | | |
| carbon black | 70 | 70 | 70 | 70 | 70 | 70 | 70 | 70 | 70 | 70 |
| zinc oxide | 5 | 5 | 5 | 5 | 5 | 5 | 5 | 5 | 5 | 5 |
| stearic acid | 1 | 1 | 1 | 1 | 1 | 1 | 1 | 1 | 1 | 1 |
| aromatic oil | — | — | — | — | — | — | — | — | — | — |
| accelerator | 1.2 | 1.2 | 1.2 | 1.2 | 1.2 | 1.2 | 1.2 | 1.2 | 1.2 | 1.2 |
| sulfur | 2.0 | 2.0 | 2.0 | 2.0 | 2.0 | 2.0 | 2.0 | 2.0 | 2.0 | 2.0 |
| Plasticizer | | | | | | | | | | |
| type | A | B | C | D | E | F | G | H | I | J |
| amount | 30 | 30 | 30 | 30 | 30 | 30 | 30 | 30 | 30 | 30 |
| Property | | | | | | | | | | |
| E' at −20° C. | 101 | 99 | 100 | 102 | 100 | 102 | 100 | 102 | 100 | 103 |
| ice skid resistance | 100 | 102 | 99 | 99 | 103 | 100 | 100 | 102 | 102 | 97 |
| plasticizer migration | 78 | 80 | 72 | 69 | 70 | 68 | 100 | 100 | 97 | 99 |
| loss on heatinq | 95 | 95 | 94 | 94 | 95 | 96 | 100 | 97 | 96 | 98 |

BR: Nipol 1220, Nippon Zeon Company

TABLE 2

| | |
| --- | --- |
| A: | reaction product of diglycerin with oleic acid |
| B: | reaction product of diglycerin with linoleic acid |
| C: | reaction product of a propylene oxide adduct of glycerin with oleic acid |
| D: | reaction product of a propylene oxide adduct of trimethylolpropane with oleic acid |
| E: | reaction product of a propylene oxide adduct of trimethylolpropane with linoleic acid |
| F: | reaction product of a propylene oxide adduct of pentaerythritol with oleic acid |
| G: | dioctyl sebacate (DOS) |
| H: | reaction product of 1,4-butanediol with oleic acid |
| I: | reaction product of trimethylolpropane with oleic acid |
| J: | trioctyl phosphate (TOP) |

TABLE 3

| Formulation | Amount (phr) |
|---|---|
| NR | 70 |
| SBR | 30 |
| carbon black | 55 |
| zinc oxide | 3.0 |
| stearic acid | 1.0 |
| accelerator (NS) | 1.2 |
| sulfur | 2.2 |

TABLE 4

| Run | IE-7 | IE-8 | IE-9 | CE-5 | CE-6 | CE-7 |
|---|---|---|---|---|---|---|
| Rubber | | | | | | |
| NR | — | — | — | — | — | — |
| BR | — | — | — | — | — | — |
| SBR | 100 | 100 | 100 | 100 | 100 | 100 |
| Additive | | | | | | |
| carbon black | 70 | 70 | 70 | 70 | 70 | 70 |
| zinc oxide | 5 | 5 | 5 | 5 | 5 | 5 |
| stearic acid | 1 | 1 | 1 | 1 | 1 | 1 |
| aromatic oil | 10 | 10 | 10 | 10 | 10 | 10 |
| accelerator | 1.2 | 1.2 | 1.2 | 1.2 | 1.2 | 1.2 |
| sulfur | 2.0 | 2.0 | 2.0 | 2.0 | 2.0 | 2.0 |
| Plasticizer | | | | | | |
| type | A | C | D | G | H | I |
| amount | 7 | 7 | 7 | 7 | 7 | 7 |
| Property | | | | | | |
| E' at −20° C. | 94 | 94 | 95 | 100 | 94 | 93 |
| ice skid resistance | 104 | 102 | 100 | 100 | 104 | 104 |
| plasticizer migration | 71 | 64 | 66 | 100 | 107 | 104 |
| loss on heating | 92 | 97 | 95 | 100 | 107 | 96 |

SBR: Nipol 1502, Nippon Zeon Company

What is claimed is:

1. A rubber composition for automotive tire treads which comprises at least one base rubber selected from the group consisting of natural rubber, butadiene rubber, styrene-butadiene rubber and polyisoprene rubber, and a plasticizer in an amount of 5 to 40 parts by weight per 100 parts by weight of said at least one base rubber, said plasticizer being derived by reacting a glycerol dimer condensate or an alkylene oxide adduct of a polyhydric alcohol with at least one higher fatty acid of 12 to 22 in carbon number or a fatty acid mixture composed predominantly of said at least one higher fatty acid, said composition being vulcanizable and suitable for use in an automotive tire.

2. The rubber composition of claim 1 wherein said polyhydric alcohol is selected from the group consisting of glycerin, gylcerol dimer condensate, trimethylolpropane and pentaerythritol.

3. The rubber composition of claim 1 wherein the alkylene oxide in said adduct is selected from the group consisting of ethylene oxide, propylene oxide and butylene oxide.

4. The rubber composition of claim 1 wherein said at least one higher fatty acid is selected from the group consisting of oleic acid, linoleic acid, lauric acid, myristic acid, palmitic acid, stearic acid and behenic acid.

5. The rubber composition of claim 1 wherein said fatty acid mixture contains a fatty acid having a carbon number of smaller than 11 or larger than 23.

6. The rubber composition of claim 1 wherein said plasticizer is selected from the group consisting of a reaction product of a glycerol dimer condensate with oleic acid, a reaction product of a glycerol dimer condensate with linoleic acid, a reaction product of a glycerol dimer condensate with behenic acid, a reaction product of a propylene oxide adduct of glycerin with oleic acid, a reaction product of a propylene oxide adduct of trimethylolpropane with oleic acid, a reaction product of a propylene oxide adduct of trimethylolpropane with linoleic acid and a reaction product of a propylene oxide adduct of pentaerythritol with oleic acid.

7. The rubber composition of claim 1, further including sulfur and a vulcanization accelerator.

* * * * *